(12) United States Patent
Klop

(10) Patent No.: US 9,889,735 B2
(45) Date of Patent: Feb. 13, 2018

(54) ACTIVE GRILL SHUTTER ACTUATION SYSTEM

(71) Applicant: FORD GLOBAL TECHNOLOGIES, LLC, Dearborn, MI (US)

(72) Inventor: Aaron Peter Klop, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/017,085

(22) Filed: Feb. 5, 2016

(65) Prior Publication Data

US 2017/0225560 A1    Aug. 10, 2017

(51) Int. Cl.
| | |
|---|---|
| *B60R 22/00* | (2006.01) |
| *E05F 15/00* | (2015.01) |
| *G05D 1/00* | (2006.01) |
| *G05D 3/00* | (2006.01) |
| *G06F 7/00* | (2006.01) |
| *G06F 17/00* | (2006.01) |
| *B60K 11/08* | (2006.01) |
| *G05D 3/12* | (2006.01) |

(52) U.S. Cl.
CPC ............ *B60K 11/085* (2013.01); *G05D 3/125* (2013.01)

(58) Field of Classification Search
CPC .. B60N 2/0248; B60N 2/0244; B60N 2/0232; B60N 2/0252; B60Q 2300/112; G05D 3/125
USPC .......................................................... 701/49
See application file for complete search history.

(56) References Cited

U.S. PATENT DOCUMENTS

| | | |
|---|---|---|
| 6,979,185 B2 | 12/2005 | Kaempe |
| 9,031,748 B2 | 5/2015 | Sakai |
| 2002/0127126 A1 | 9/2002 | Kaempe |
| 2013/0223980 A1 | 8/2013 | Pastrick et al. |
| 2015/0147949 A1 | 5/2015 | Macfarlane et al. |

FOREIGN PATENT DOCUMENTS

| | | |
|---|---|---|
| CN | 103863095 A | 6/2014 |
| EP | 0163986 A1 | 12/1985 |
| KR | 101272925 B1 | 6/2013 |

OTHER PUBLICATIONS

English machine translation of KR 101272925.
English machine translation of EP 0163986.
English machine translation of CN 103863095.

Primary Examiner — Maceeh Anwari
(74) Attorney, Agent, or Firm — Jason Rogers; King & Schickli, PLLC

(57) ABSTRACT

A grille shutter actuation system for a vehicle includes a grille shutter, a linear actuator having a cylinder with first and second orifices and a piston. The piston is connected to the grille shutter for moving same. Fluid is pumped into one of the orifices through first or second hoses for moving the piston. A bi-directional motor is connected to the pump, and a controller controls a direction of rotation of a motor shaft in response to an input. A control module provides the input to the controller which determines whether fluid is pumped into the first or second orifice dependent upon the direction of rotation of the shaft. The input is determined by the control module based on information from the controller and/or a sensor associated with the grille shutter. The pump and motor may be remotely mounted within an engine compartment, for example, a distance from the linear actuator(s).

20 Claims, 5 Drawing Sheets

US 9,889,735 B2

ACTIVE GRILL SHUTTER ACTUATION SYSTEM

TECHNICAL FIELD

This document relates generally to grille shutters, and more specifically to an active grille shutter actuation system for a vehicle.

BACKGROUND

Active grille shutters which automatically control airflow through a grille opening are quickly becoming a common feature within the automotive industry due primarily to their ability to improve operating efficiency. When the grille shutters are open, they allow air to flow through the grille opening and the radiator, and into the engine compartment to promote cooling. When cooling is not required, however, the grille shutters are closed blocking air flow through the grille opening and rerouting the air flow around the vehicle. This reduces aerodynamic drag which reduces fuel consumption and improves the efficiency of the vehicle.

One example of the utilization of active grille shutters is shown by the assignee of the presently described invention in U.S. Published Patent Application No. 2015/0147949. Therein, methods and systems are described for adjusting vehicle grille shutters based on a direction of motion of the grille shutters, a desired opening of the grille shutters, and vehicle speed. The direction of motion of the active grille shutters is determined by comparing a desired motor position to an actual motor position. In this instance, the motor actuates the grille shutters in response to a control system. However, the motor is either directly coupled to the grille shutters or indirectly through a series of rigid shafts and gears. In other words, the motor is mechanically linked to the grille shutters.

While this and similar arrangements are effective in moving the grille shutters and controlling the flow of air through the grille opening, the motor is required to be mechanically linked to the grille shutters which significantly reduces the options for packaging the motor within the engine compartment. Given the limited space within engine compartments, it would be advantageous to locate the motor, or the driving force for actuation of the grille shutters, apart or remote from the grille and grille shutters. Such technology would further reduce costs associated with traditional rotary actuators by eliminating the need for complex mechanical gear train gears and coupling seals and would necessarily improve low speed damageability performance by replacing the rigid kinematic linkages with flexible hoses used with hydraulic actuators to move the grille shutters.

Even more, information regarding a real time position of the grille shutters or positive position feedback would allow for more robust feedback sufficient to meet evolving environmental related requirements controlled by the vehicle's onboard diagnostic system. The use of sensors, such as potentiometers, provides improved feedback in this regard and ensures that the active grille shutters are functioning properly.

SUMMARY OF THE INVENTION

In accordance with the purposes and benefits described herein, a grille shutter actuation system is provided for a vehicle. The system may be broadly described as including a grille shutter, a linear actuator supported by the grille shutter, the linear actuator having a cylinder with first and second orifices and a piston, the piston connected to the grille shutter for moving at least one vane of the grille shutter, a bi-rotational pump for pumping fluid into one of the first orifice through a first hose or the second orifice through a second hose for moving the piston, a bi-directional motor having an output shaft connected to the pump, and a controller for controlling a direction of rotation of the output shaft in response to an input, and a control module for providing the input to the controller, wherein the fluid is pumped into one of the first orifice or the second orifice depending upon a direction of rotation of the output shaft for moving the piston and the at least one vane of the grille shutter.

In another possible embodiment, the system further includes a position sensor associated with the grille shutter, the position sensor providing feedback regarding a position of the grille shutter to the control module.

In still another possible embodiment, the bi-rotational pump is remote from the linear actuator and connected to the linear actuator by the first hose and the second hose. In yet another, the bi-rotational pump is positioned adjacent a washer bottle within an engine compartment of the vehicle and connected to the linear actuator by the first hose and the second hose.

In an additional possible embodiment, the grille shutter actuation system further includes a second linear actuator supported by the grille shutter, the second linear actuator having a cylinder with first and second orifices and a piston, the piston connected to the grille shutter for moving at least one additional vane of the grille shutter.

In another possible embodiment, the bi-rotational pump pumps fluid into one of the first orifice of the second linear actuator through a third hose or the second orifice of the second linear actuator through a fourth hose for moving the piston of the second linear actuator.

In yet still another possible embodiment, the bi-rotational pump is remote from the first linear actuator and the second linear actuator and connected to the second linear actuator by the third hose and the fourth hose. In still another embodiment, the system further includes a second position sensor associated with the grille shutter, the second position sensor providing feedback regarding a position of the at least one additional vane of the grille shutter to the control module.

In one other possible embodiment, a vehicle having a grille opening includes a grille shutter for controlling a flow of air through the grille opening, a linear actuator supported by the grille shutter, the linear actuator having a cylinder with first and second orifices and a piston, the piston connected to the grille shutter for moving the grille shutter, a pump for pumping fluid through a first hose into the first orifice or through a second hose into the second orifice for moving the piston, a motor having an output shaft connected to the pump, and a control module for providing an input to the motor, wherein the fluid is pumped into one of the first orifice or the second orifice depending upon a direction of rotation of the output shaft for moving the piston and the at least one vane of the grille shutter.

In another possible embodiment, the pump is remote from the linear actuator and connected to the linear actuator by the first hose and the second hose.

In yet another possible embodiment, the vehicle further includes a position sensor associated with the grille shutter, the position sensor providing feedback regarding a position of the grille shutter to the control module.

In yet still another possible embodiment, the pump of the vehicle is bi-directional, and the motor is bi-rotatable and includes a controller for controlling a direction of rotation of the output shaft in response to the input provided by the control module.

In still one other possible embodiment, a grille shutter actuation system for a vehicle includes a grille shutter having a plurality of vanes, at least two linear actuators, each of the at least two linear actuators having a cylinder with first and second orifices and a piston, the piston connected to at least one of the plurality of vanes for moving the at least one of the plurality of vanes, a bi-rotational pump for moving fluid into at least one of the at least two linear actuators through a first hose or through a second hose, a bi-directional motor having an output shaft connected to the pump, and a controller for controlling a direction of rotation of the output shaft in response to an input, and a control module for providing the input to the controller, wherein the fluid is pumped into at least one of the at least two linear actuators for moving at least one of the plurality of vanes.

In another possible embodiment, the at least two linear actuators are supported by a frame of the grille shutter. In yet another possible embodiment, the bi-rotational pump and the bi-directional motor are mounted within an engine compartment a distance from the at least two linear actuators and the bi-rotational pump is connected to the at least two linear actuators by the first hose and the second hose.

In one additional possible embodiment, the first hose includes a first portion connected to the bi-rotational pump and a second portion connected between the first portion of the first hose and the first orifice of each of the at least two linear actuators, and the second hose includes a first portion connected to the bi-rotational pump and a second portion connected between the first portion of the second hose and the second orifice of each of the at least two linear actuators.

In another possible embodiment, the input is determined by the control module based on information from at least one of the controller, and at least one position sensor associated with at least one of the plurality of vanes of the grille shutter.

In still another, the bi-rotational pump and the bi-directional motor are mounted within an engine compartment a distance from the at least two linear actuators and the bi-rotational pump is connected to the at least two linear actuators by the first hose and the second hose.

In other possible embodiments, the grille shutter actuation systems described above are incorporated into a vehicle.

In the following description, there are shown and described several embodiments of a grille shutter actuation system for a vehicle. As it should be realized, the systems, and related methods, are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the grille shutter actuation system, and methods, and together with the description serve to explain certain principles thereof. In the drawing figures.

Reference will now be made in detail to the present embodiments of the grille shutter actuation system for a vehicle and related methods, examples of which are illustrated in the accompanying drawing figures, wherein like numerals are used to represent like elements.

DETAILED DESCRIPTION

Figure 1:
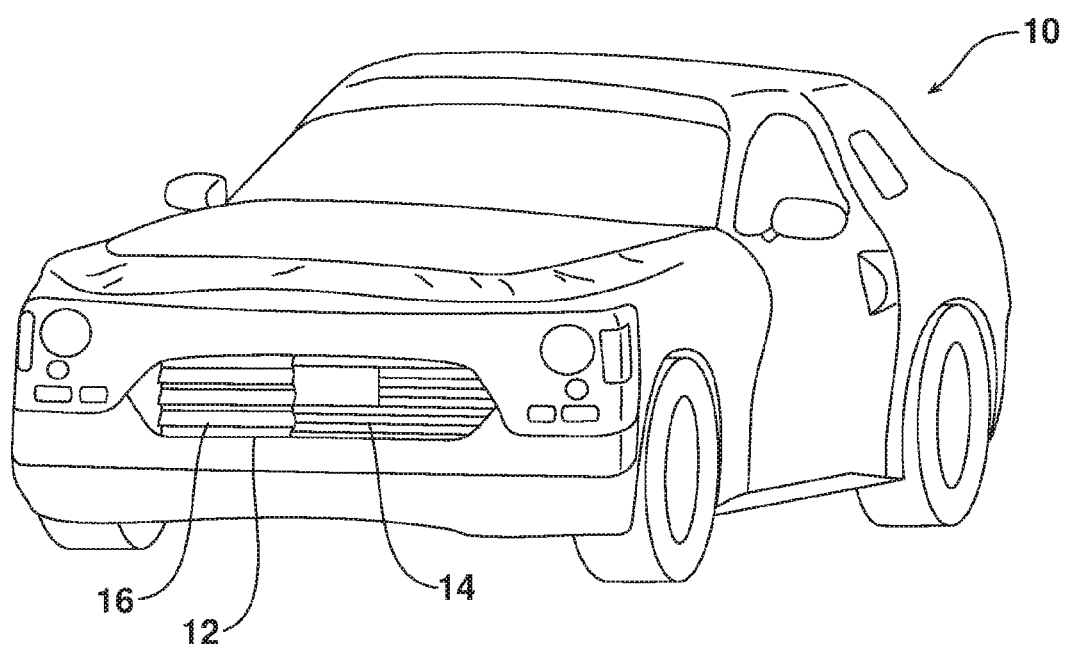
FIG. 1 is a perspective view of a vehicle showing a partial front grille and partial grille shutters.

Reference is now made to FIG. 1 which illustrates a vehicle 10 having a grille opening 12 and a grille 14 partially covering a plurality of grille shutters 16 of the vehicle. The plurality of grille shutters 16 are shown in a partially open position. In this position, ambient air is allowed to flow through the grille 14, the grille shutters 16, and the grille opening 12 into an engine compartment 26 of the vehicle 10. Although not shown, it is commonly known that the ambient air flow may be used by a heat exchanger (e.g., a radiator 28) to cool the engine or may otherwise be utilized to provide cooling to vehicle systems.

Figure 2:
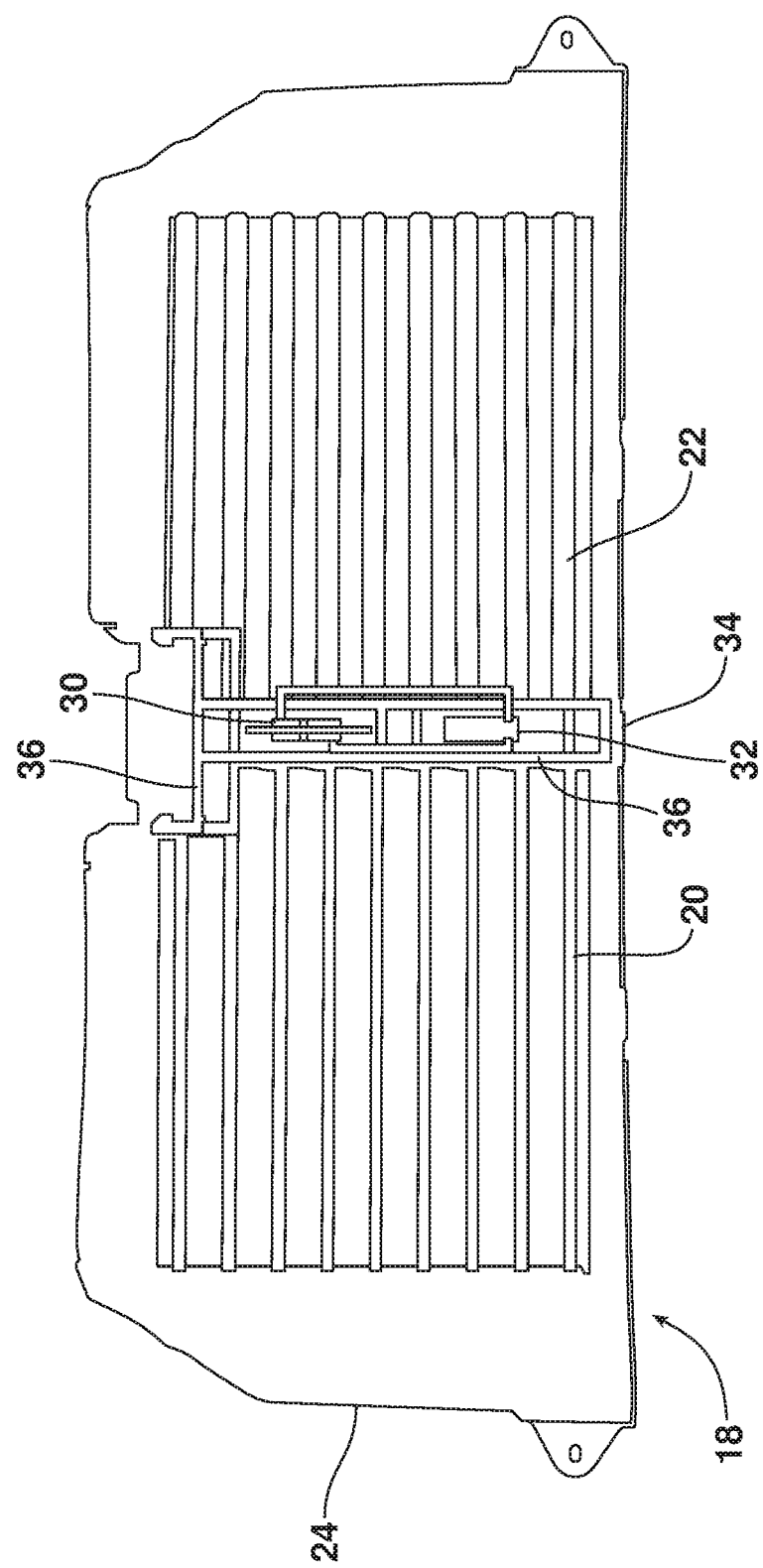
FIG. 2 is a is rear plan view of a plurality of grille shutters mounted in a frame for movement between open and closed positions.

FIG. 2 provides a rear view of one possible active grille shutter assembly 18. The active grille shutter assembly 18 is positioned on the engine compartment side and attached adjacent the grille opening 12. In the described embodiment, the plurality of grille shutters 16 or vanes of the active grille shutter assembly 18 are divided into a right group of grille shutters 20 and a left group of grille shutters 22. Both the right and the left groups 20, 22 are mounted within a frame 24 for movement between fully open, partially open, and fully closed positions.

In the described embodiment, the right and left groups of grille shutters 20, 22 are moved, or actuated, together. However, the right group of grille shutters 20 is shown in the fully open position and the left group of grille shutters 22 is shown in the fully closed position in FIG. 2 merely to illustrate these two positions. Of course, the right and left groups of grille shutters 20, 22 may both be closed, both be open, or both be partially open. In an alternate embodiment including more than one actuator, the right and left groups of grille shutters may operate independently. In such an embodiment, the right and left groups of grille shutters may both be closed, both be open, both be partially open, both be partially open at varying angles, or one group of grille shutters may be closed while the other group is open or partially open. Even more, the right and left groups of grille shutters 20, 22 may be further subdivided in alternate embodiments into four or more subgroups including, for example, upper right side vanes, lower rights side vanes, upper left side vanes, and lower left side vanes.

As is known, opening, partially opening and closing the grille shutters 16 is utilized primarily to improve vehicle efficiency. When the grille shutters 16 are open, ambient air is allowed to flow through the grille opening 12 and into the engine compartment 26 to promote cooling. When cooling is not required, however, the grille shutters 16 are closed blocking air flow through the grille opening 12 and rerouting the air flow around the vehicle 10. This reduces aerodynamic drag which reduces fuel consumption and improves the efficiency of the vehicle 10.

Figure 3:
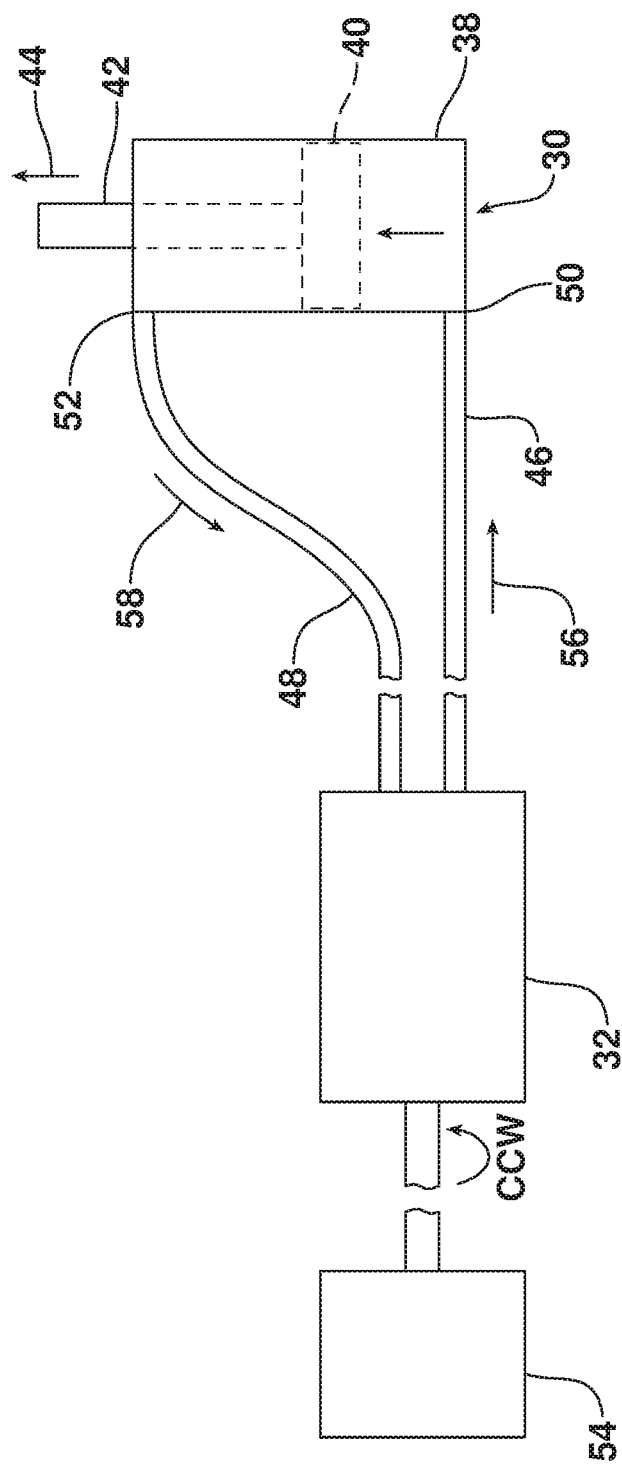
FIG. 3 is an illustration of a motor, pump and linear actuator.

In the described embodiment shown in FIG. 2, an actuator 30 and a pump 32 are mounted on a central member 34 of the frame 24 in between the right and left groups of grille shutters 20, 22 for moving the grille shutters 16 via mechanical linkages 36 or members, between positions. As shown in FIG. 3, the actuator 30 includes a cylinder 38 and a piston 40 positioned therein. A connecting rod or shaft 42 of the piston 40 extends from the cylinder 38 and moves linearly, as shown by action arrow 44, in a direction substantially in line with a length of the actuator 30 dependent upon movement of the piston.

The pump 32, in the described embodiment, is a bi-directional pump in fluid connection with the actuator 30 via a first hose 46 and a second hose 48. More specifically, the first hose 46 is connected to a first orifice 50 of the cylinder 38 (shown below the piston) and the second hose 48 is connected to a second orifice 52 of the cylinder (shown above the piston). Depending on a clockwise or a counter clockwise direction of rotation of the pump 32, the pump discharges pressurized fluid through the first hose 46 or the second hose 48 to an associated cylinder orifice 50 or 52.

The pump 32 further includes a two-way check valve (not shown) that allows the fluid to flow into either the first hose 46 or the second hose 48 depending on the direction of rotation of the pump. In other words, when a pump motor 54 is rotating in a first direction, fluid is pumped through the first hose 46 into the first orifice 50 of the cylinder causing the piston 40 to move and the actuator shaft 42 to extend outward (upward as shown) from the cylinder 38. At the same time, fluid is forced from the second orifice 52 of the cylinder back through the second hose 48 to the pump 32. Similarly, when the rotation of the pump 32 is reversed and the pump motor 54 is rotating in a second direction, fluid is pumped through the second hose 48 into the upper orifice 52 of the cylinder causing the piston 40 to move and retract the actuator shaft 42 inward (downward as shown). At the same time, fluid is forced from the first orifice 50 of the cylinder 38 back through the first hose 46 to the pump 32.

As shown in FIG. 3, the pump 32 is being driven in a counter clockwise direction by the motor 54. This pumps fluid through the first hose 46 as shown by action arrow 56 and into the first orifice 50 of the cylinder 38. This causes the piston 40 and the actuator shaft 42 to move (upward as shown by action arrow 44) forcing fluid out of the second cylinder orifice 52, into the second hose 48, and back to the pump 32 as shown by action arrow 58. The result of the movement of the piston 40 is to move or extend the actuator shaft 42 relative the cylinder 38. Reversing the motor 54 and pump 32 necessarily reverses the flow of fluid and retracts the actuator shaft 42 into the cylinder 38.

In the described embodiment, this movement of the actuator shaft 42 is translated through mechanical linkages 36 to the plurality of grille shutters 16 for moving the grille shutters between the open, partially open, and closed positions. In alternate embodiments, the grille shutters may themselves be coupled or linked for movement together and/or the actuator shaft may be coupled directly to one or more of the grille shutters obviating the need for the mechanical linkages. Of course, the mechanical linkages 36 can take any shape or any combination of members necessary to translate the movement of actuator shaft 42 to the plurality of grille shutters 16 may be utilized.

Even more, the actuator 30 may be coupled to one or more grille shutters. For example, the actuator may be coupled to a first grille shutter with the first grille shutter mechanically linked to the remaining grille shutters. In another example, the actuator may be coupled to each grille shutter or, in alternate embodiments, to groups of grille shutters. Further, in some embodiments, the grille shutter actuation system may include more than one actuator for controlling more than one group or more than one individual grille shutter.

Figure 4:
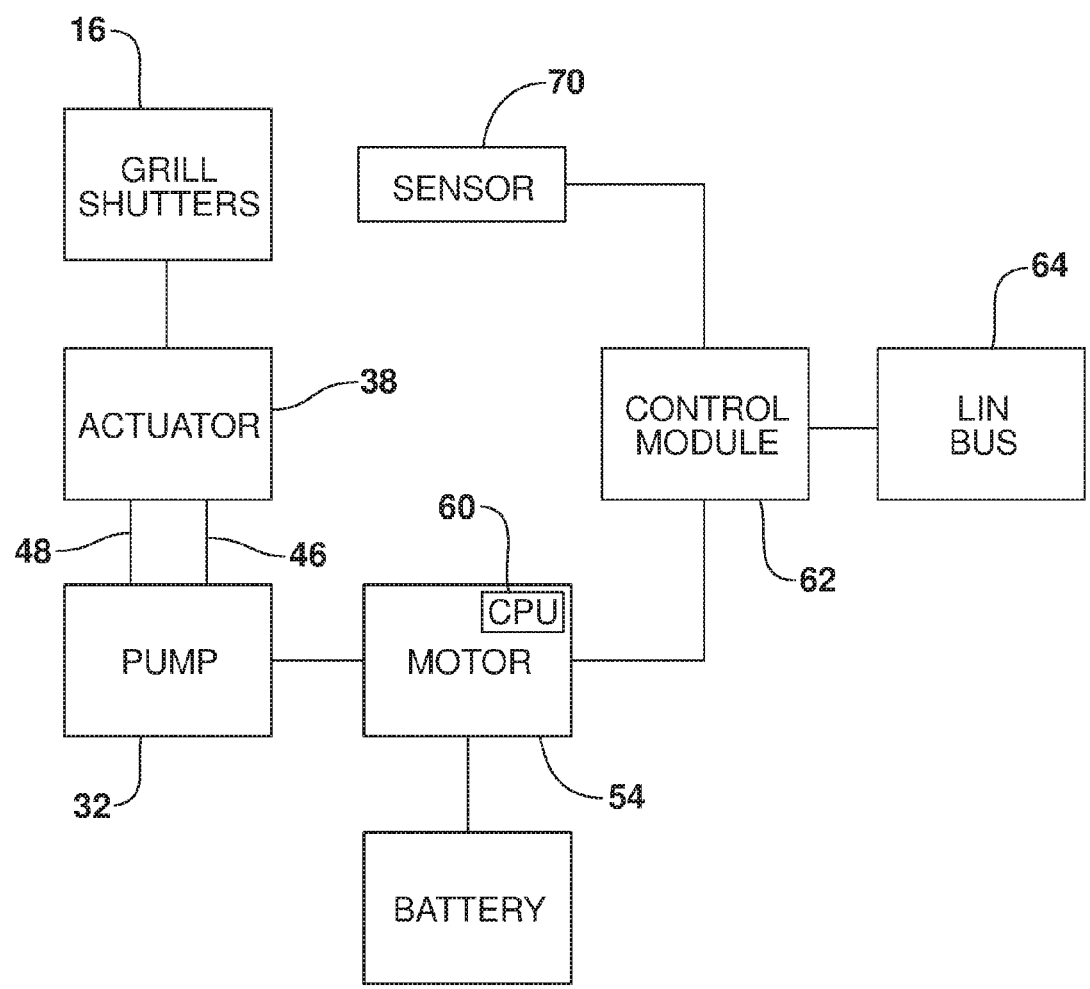
FIG. 4 is a schematic representation of the grille shutter actuation system.

As shown schematically in FIG. 4, the motor 54 in the described embodiment includes a central processing unit ("CPU") 60 or controller having its own logic and control software. Input from a vehicle control module 62 directs the motor 54 regarding which direction and how far to rotate thereby controlling movement of the piston 40 and shaft 42 of the linear actuator 30. For example, the control module 62 may command the motor via controller 60 to fully open the grille shutters 16 (e.g., to 100% open) or partially open the grille shutters to 42% open.

The control module 62 is the vehicle's powertrain control module ("PCM") in the described embodiment. The PCM 62 communicates with the motor 54 directly in the described embodiment, but may communicate with the motor indirectly via a second or third control module communicating with the PCM via a controller area network, for example, a LIN bus 64. In the described embodiment, the PCM 62 communicates with other vehicle control modules via the LIN bus 64. Even more, the control module 62 could be a designated active grille shutter control module, or another control module in the vehicle, in communication with the PCM or other control modules via the LIN bus.

Figure 5:
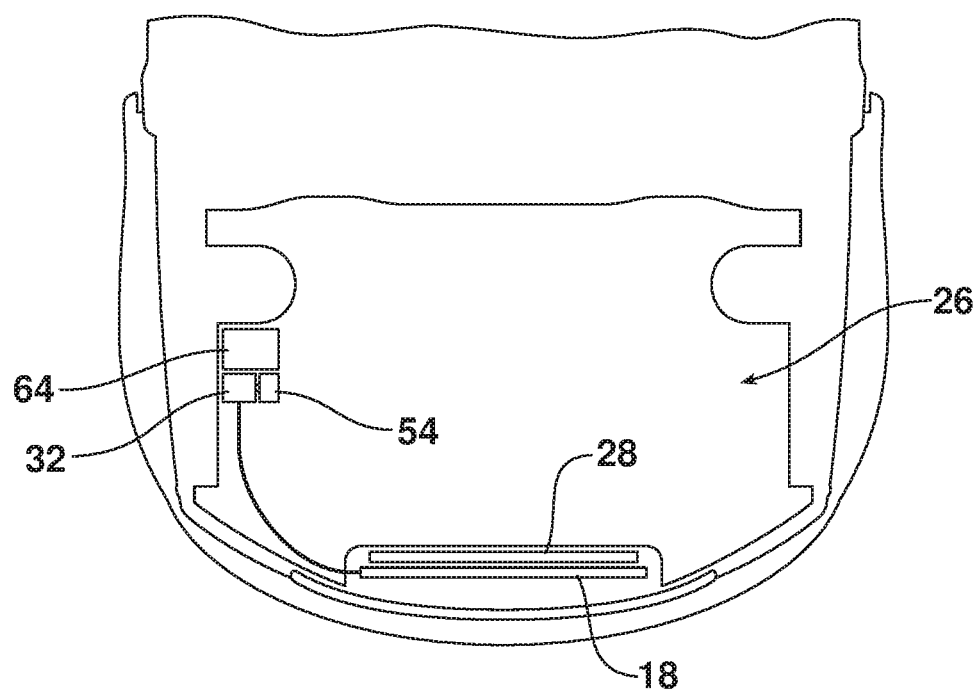
FIG. 5 is a top view of an engine compartment of the vehicle.

Although the pump 32 and actuator 30 are shown attached to the central member 34 of the frame 24 in FIG. 2, the flexible nature of the first and second hoses 46, 48 allows the motor 54 and the pump 32 to be positioned anywhere within the engine compartment 26, or elsewhere in the vehicle 10. In one embodiment shown in FIG. 5, the motor 54 and the pump 32 may be positioned adjacent a washer bottle 64 within the engine compartment 26. Regardless of where the motor 54 and the pump 32 are positioned, the flexible nature of the first and second hoses 46, 48 when compared to mechanical linkages utilized by prior art designs provides significant design flexibility. By varying the lengths of the first and second hoses 46, 48, the hoses maintain the actuator 30 in fluid communication with the pump 32 regardless of its location within the vehicle 10. Even more, the use of flexible hoses necessarily improves low speed damageability performance by replacing the rigid kinematic linkages.

In one embodiment, the motor 32 may be a stepper motor. As such, the motor 32 may only move the actuator shaft 42 a finite number of positions. Further, the motor 32 may have a minimum amount that it must move with each actuation. For example, the motor 32 may only move in six degree increments. In another example, the motor may move in a different number of degree increments. As such, the motor may have a finite number of motor positions and a desired grille shutter position may not align with an actual resulting grille shutter position after moving the grille shutters with the motor. The motor may instead move the grille shutters to the closest available position to the commanded grille shutter position.

Upon receiving a command from a controller 62, the motor 32 rotates its shaft in a clockwise or counterclockwise direction causing the pump 32 to pump fluid into the first hose 46 or the second hose 48 depending on the direction of rotation of the shaft. The first hose 46 is connected to a cylinder 38 of a linear actuator 30 and directs the fluid into a first orifice 50 thereby moving the piston 40 in a first direction. Similarly, the second hose 48 is connected to the cylinder 38 of the linear actuator 30 and directs the fluid into a second orifice 52 thereby moving the piston 40 in a second direction.

As the piston 40 is moved in either the first or second direction, the grille shutter 16 is rotated into a position corresponding to the commanded grille shutter position. In one example, the command may be a motor position translated from a commanded grille shutter position. In another example, the command may be the commanded grille shutter position which has a corresponding motor position. The commanded grille shutter position may be a percentage opening (or closing) or an opening angle (e.g., opening degree). For example, 0% open may correspond to a grille shutter angle of 0 degrees, measured from a vertical axis of the grille shutter.

As discussed above, the commanded grille shutter position may not match up with an exact motor position. Thus, the motor 32 may actuate the grille shutter 16 into the position closest to the commanded position. A position sensor 70 may be coupled along the grille shutter system 18 to provide feedback of an actual grille shutter position to a controller 62 (such as the PCM) as shown in FIG. 4. The position sensor 70 may be positioned adjacent a grille shutter 16. However, in alternate embodiments, the position sensor 70 may be positioned at different positions relative the grille shutter 16 or more than one position sensor may be utilized. The output of the position sensor 70 may be a positive position feedback or a real time position of the grille shutters 16.

In some cases, the real time position of the grille shutters 16 may be different than the commanded position, thereby resulting in a position error. As discussed above, the actual grille shutter position may be different than the commanded grille shutter position due to the available motor increments not matching exactly with the desired shutter angle. In such a scenario, adjustments to the motor position and thus the grille shutter position may be made.

In summary, numerous benefits result from the utilization of active grille shutters 16 controlled by a fluid driven linear actuator 30 including elimination of mechanical linkages between a motor 54 and the grille shutters. This significantly increases the options for packaging the motor 54 and pump 32 within the engine compartment 26 and provides for remote placement of the motor and pump relative the grille 14 and grille shutters 16. Use of linear actuators further reduces costs associated with traditional rotary actuators by eliminating the need for complex mechanical gear train gears and coupling seals and improves low speed damageability performance by replacing the rigid kinematic linkages with flexible hoses. Even more, one or more sensors 70 provide real time positional information regarding the grille shutters 16 and ensure that the grille shutters are functioning properly. Such real time information provides more robust feedback that is sufficient to meet evolving environmental related requirements controlled by the vehicle's onboard diagnostic system.

The foregoing has been presented for purposes of illustration and description. It is not intended to be exhaustive or to limit the embodiments to the precise form disclosed. Obvious modifications and variations are possible in light of the above teachings. For example and as suggested above, more than one linear actuator may be utilized to control two or more groups of grille shutters. In such an embodiment, the motor and pump could still be positioned within the engine compartment and the first hose could be connected to first orifices, for example, of both first and second actuators. Similarly, a second hose could be connected to second orifices of both the first and second actuators. In other words, the first and second hoses could be Y-shaped with a first end connected to the pump and second and third ends connected to first and second actuators.

In other alternate embodiments, multiple actuators could be connected to groups or subgroups of grille shutters, or even to individual grille shutters in a one to one relationship and each multiple actuator may be connected to one or more pumps/motors providing independent control. All such modifications and variations are within the scope of the appended claims when interpreted in accordance with the breadth to which they are fairly, legally and equitably entitled.

What is claimed:

1. A grille shutter actuation system for a vehicle comprising:
   a grille shutter;
   a linear actuator supported by said grille shutter, said linear actuator having a cylinder with first and second orifices and a piston, said piston connected to said grille shutter for moving at least one vane of said grille shutter;
   a bi-rotational pump for pumping fluid into one of said first orifice through a first hose or said second orifice through a second hose for moving said piston;
   a bi-directional motor having an output shaft connected to said pump, and a controller for controlling a direction of rotation of said output shaft in response to an input; and
   a control module for providing the input to said controller, wherein the fluid is pumped into one of said first orifice or said second orifice depending upon the direction of rotation of said output shaft for moving said piston and said at least one vane of said grille shutter.

2. The grille shutter actuation system of a vehicle claim 1, further comprising a position sensor associated with said grille shutter, said position sensor providing feedback regarding a position of said grille shutter to said control module.

3. The grille shutter actuation system for a vehicle of claim 1, wherein said bi-rotational pump is remote from said linear actuator and connected to said linear actuator by said first hose and said second hose.

4. The grille shutter actuation system for a vehicle of claim 1, wherein said bi-rotational pump is positioned adjacent a washer bottle within an engine compartment of the vehicle and connected to said linear actuator by said first hose and said second hose.

5. The grille shutter actuation system of a vehicle claim 4, further comprising a position sensor associated with said grille shutter, said position sensor providing feedback regarding a position of said grille shutter to said control module.

6. The grille shutter actuation system of a vehicle claim 2, further comprising a second linear actuator supported by said grille shutter, said second linear actuator having a cylinder with first and second orifices and a piston, said piston connected to said grille shutter for moving at least one additional vane of said grille shutter.

7. The grille shutter actuation system of a vehicle claim 6, wherein said bi-rotational pump pumps fluid into one of said first orifice of said second linear actuator through a third hose or said second orifice of said second linear actuator through a fourth hose for moving said piston of said second linear actuator.

8. The grille shutter actuation system for a vehicle of claim 7, wherein said bi-rotational pump is remote from said first linear actuator and said second linear actuator and connected to said second linear actuator by said third hose and said fourth hose.

9. The grille shutter actuation system of a vehicle claim 6, further comprising a second position sensor associated with said grille shutter, said second position sensor providing feedback regarding a position of said at least one additional vane of said grille shutter to said control module.

10. A vehicle incorporating the grille shutter actuation system of claim 1.

11. A vehicle having a grille opening comprising:
a grille shutter for controlling a flow of air through the grille opening;
a linear actuator supported by said grille shutter, said linear actuator having a cylinder with first and second orifices and a piston, said piston connected to said grille shutter for moving said grille shutter;
a pump for pumping fluid through a first hose into said first orifice or through a second hose into said second orifice for moving said piston;
a motor having an output shaft connected to said pump; and
a control module for providing an input to said motor,
wherein the fluid is pumped into one of said first orifice or said second orifice depending upon a direction of rotation of said output shaft for moving said piston and said at least one vane of said grille shutter.

12. The vehicle having a grille opening of claim 11, wherein said pump is remote from said linear actuator and connected to said linear actuator by said first hose and said second hose.

13. The vehicle having a grille opening of claim 12, further comprising a position sensor associated with said grille shutter, said position sensor providing feedback regarding a position of said grille shutter to said control module.

14. The vehicle having a grille opening of claim 11, wherein said pump is bi-directional, and said motor is bi-rotatable and includes a controller for controlling a direction of rotation of said output shaft in response to the input provided by said control module.

15. A grille shutter actuation system for a vehicle comprising:
a grille shutter having a plurality of vanes;
at least two linear actuators, each of said at least two linear actuators having a cylinder with first and second orifices and a piston, said piston connected to at least one of said plurality of vanes for moving said at least one of said plurality of vanes;
a bi-rotational pump for moving fluid into at least one of said at least two linear actuators through a first hose or through a second hose;
a bi-directional motor having an output shaft connected to said pump, and a controller for controlling a direction of rotation of said output shaft in response to an input; and
a control module for providing the input to said controller,
wherein the fluid is pumped into at least one of said at least two linear actuators for moving at least one of said plurality of vanes.

16. The grille shutter actuation system of a vehicle claim 15, wherein said at least two linear actuators are supported by a frame of said grille shutter.

17. The grille shutter actuation system of a vehicle claim 15, wherein said bi-rotational pump and said bi-directional motor are mounted within an engine compartment a distance from said at least two linear actuators and said bi-rotational pump is connected to said at least two linear actuators by said first hose and said second hose.

18. The grille shutter actuation system of a vehicle claim 17, wherein said first hose includes a first portion connected to said bi-rotational pump and a second portion connected between said first portion of said first hose and said first orifice of each of said at least two linear actuators, and said second hose includes a first portion connected to said bi-rotational pump and a second portion connected between said first portion of said second hose and said second orifice of each of said at least two linear actuators.

19. The grille shutter actuation system of a vehicle claim 15, wherein the input is determined by said control module based on information from at least one of said controller, and at least one position sensor associated with at least one of said plurality of vanes of said grille shutter.

20. A vehicle incorporating the grille shutter actuation system of claim 19.

* * * * *